United States Patent [19]
Yamauchi et al.

[11] Patent Number: 5,350,214
[45] Date of Patent: Sep. 27, 1994

[54] REAR BODY STRUCTURE FOR AUTOMOTIVE VEHICLE

[75] Inventors: Makoto Yamauchi, Hiroshima; Eiichiro Iida, Higashihiroshima, both of Japan

[73] Assignee: Mazda Motor Corporation, Hiroshima, Japan

[21] Appl. No.: 58,737

[22] Filed: May 10, 1993

[30] Foreign Application Priority Data

May 8, 1992 [JP] Japan .............. 4-030076[U]

[51] Int. Cl.$^5$ ............................................ B62D 23/00
[52] U.S. Cl. ................... 296/204; 296/195; 296/198
[58] Field of Search ............ 296/195, 204, 198; 280/668, 710

[56] References Cited

U.S. PATENT DOCUMENTS

| | | | |
|---|---|---|---|
| 4,408,794 | 10/1983 | Harasaki | 296/195 X |
| 5,174,628 | 12/1992 | Hayatsugu et al. | 296/195 X |
| 5,180,206 | 1/1993 | Toyoda | 296/195 X |

FOREIGN PATENT DOCUMENTS 62-200077  12/1987  Japan .
63-69679   5/1988   Japan .

*Primary Examiner*—Joseph D. Pape
*Attorney, Agent, or Firm*—Keck, Mahin & Cate

[57] ABSTRACT

A rear body structure of a vehicle including right and left rear suspension towers, each jutting upward and sideways into a compartment so as to form a housing for supporting a rear suspension, has a gusset panel which extends transversely in the compartment between the rear suspension towers and is secured to a floor and the right and left rear suspension towers, a first panel and a second panel secured, respectively, to the right and left suspension towers from the front and the back and the gusset panel. These gusset panel and the first and second panels extend transversely in the compartment between the right and left rear suspension towers so as to provide a closed cross sectional hollow structure between and above the right and left rear suspension towers.

7 Claims, 5 Drawing Sheets

REAR BODY STRUCTURE FOR AUTOMOTIVE VEHICLE

BACKGROUND OF THE INVENTION

1. Field of the Invention

The present invention relates to a structure for the rear section of a vehicle body, and, more particular, to a rear body structure for a vehicle which provides an improved rigidity of rear suspension towers.

2. Description of Related Art

Typically, in a body structure of the rear section of an automotive vehicle, right and left shock absorbers are installed on both sides of the vehicle body so that the distance between axes of these shock absorbers widens toward their lower ends as viewed in a lengthwise direction of the vehicle body, which attributes to the arrangement of right and left rear suspensions. Such a rear body structure makes a rear suspension tower tend to easily fall sideways towards the compartment with a thrust-up force from the shock absorber. Conventionally, in order to prevent the rear suspension tower from falling sideways, the rear suspension tower is provided with a gusset which is located inside the rear body or in the rear compartment of the vehicle and interconnects the front ends of the right and left rear suspension tower and a floor panel so as to increase the structural rigidity of the right and left rear suspension tower against sideways fall. Such a rear body structure is known from, for instance, Japanese Unexamined Utility Model Publication No. 63-69679. Otherwise, as is known from, for instance, Japanese Unexamined Utility Model Publication No. 62-200077, a rear body structure is provided with what is called a "package tray or upper back panel," which is placed above and between the right and left rear suspension towers so as to extend backward from a rear compartment and is bolted to the right and left rear suspension towers, and a reinforcement. These package tray and reinforcement are joined so as to form a closed cross-sectional hollow structure extending sideways from each rear suspension tower.

In the rear body structure provided with a gusset extending sideways from the rear suspension tower, a distance or interval. between fulcrums of the right and left rear suspension towers at which the gussets are connected is concerned in the effective prevention of sideways fall of the rear suspensions. Nevertheless, the rear body structure only provides a transverse width of the gusset for the distance between fulcrums at the greatest, and has only an structural rigidity insufficient for sideways fall, in some cases, due to thrust-up force exerted to the rear suspension tower from a shock absorber.

On the other hand, the rear body structure formed with a closed cross section by a gusset extending sideways from the rear suspension tower provides a sufficient distance between fulcrums. However, since the top ends of the right and left rear suspension towers are interconnected by means of a hollow structure having a closed cross section, if the right and left rear suspension towers are subjected to uneven thrust-up force from the right and left shock absorbers, they cause a relative twist therebetween.

SUMMARY OF THE INVENTION

It is a primary object of the present invention to provide a rear body structure for a vehicle which provides a rigidity sufficient independently for right and left rear suspension towers against sideways fall.

It is another object of the present invention to provide a fulcrum distance between the right and left rear suspension towers sufficient for right and left rear suspension towers against a relative twist.

The above objects are achieved by providing a rear body structure of a vehicle including right and left rear suspension towers, for supporting upper ends of rear suspensions, each of which is disposed on one side of a compartment of the vehicle. The suspension tower juts upward from a floor of the compartment and sideways into the compartment from a rear fender so as to form wall portions at least on the front and the back of the rear suspension tower for defining a housing in which rear suspension is placed. The rear body structure has a gusset panel which extends transversely in the compartment between the rear suspension towers and is secured to the floor and the right and left rear suspension towers, a first panel and a second panel, such as a package gusset and a package junction, secured, respectively, to the right and left suspension towers from the front and the back and the gusset panel. These gusset panel and the first and second panels extend transversely in the compartment between the right and left rear suspension towers so as to provide a closed cross sectional hollow structure between and above the right and left rear suspension towers.

According to the rear body structure of the invention, thanks to the closed cross sectional hollow structure, the right and left rear suspension towers are independently increased in structural rigidity by means of the gusset panel extending between the floor and the hollow structure and, in addition, are disposed at a fulcrum distance sufficient to prevent sideways fall and relative twist due to thrust-up force unevenly exerted thereto from right and left shock absorber.

BRIEF DESCRIPTION OF THE DRAWINGS

The above and other objects and features of the present invention will be understood more clearly and fully from the following detailed description of the preferred embodiment thereof when considered in conjunction with the accompanying drawings. In the drawings, the same reference numbers have been used to denote the same or similar elements throughout.

DESCRIPTION OF THE PREFERRED EMBODIMENT

Because structures of the right and left rear sections of a vehicle body are identical, the following description will be directed, for example, to a structure of the right rear section only.

Figure 1:
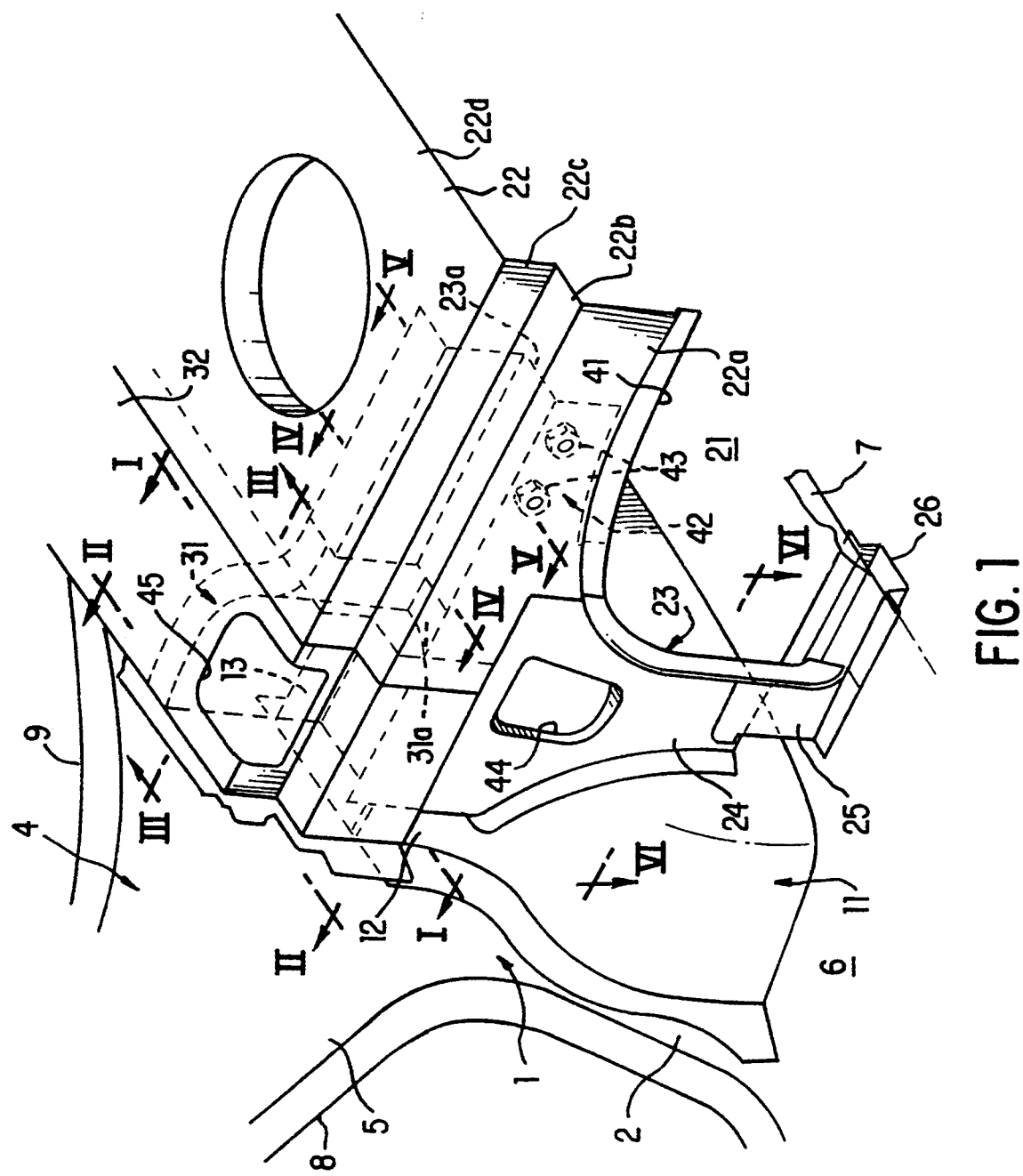
FIG. 1 is a perspective view of a rear body as viewed from the inside of the vehicle.
Figure 2:
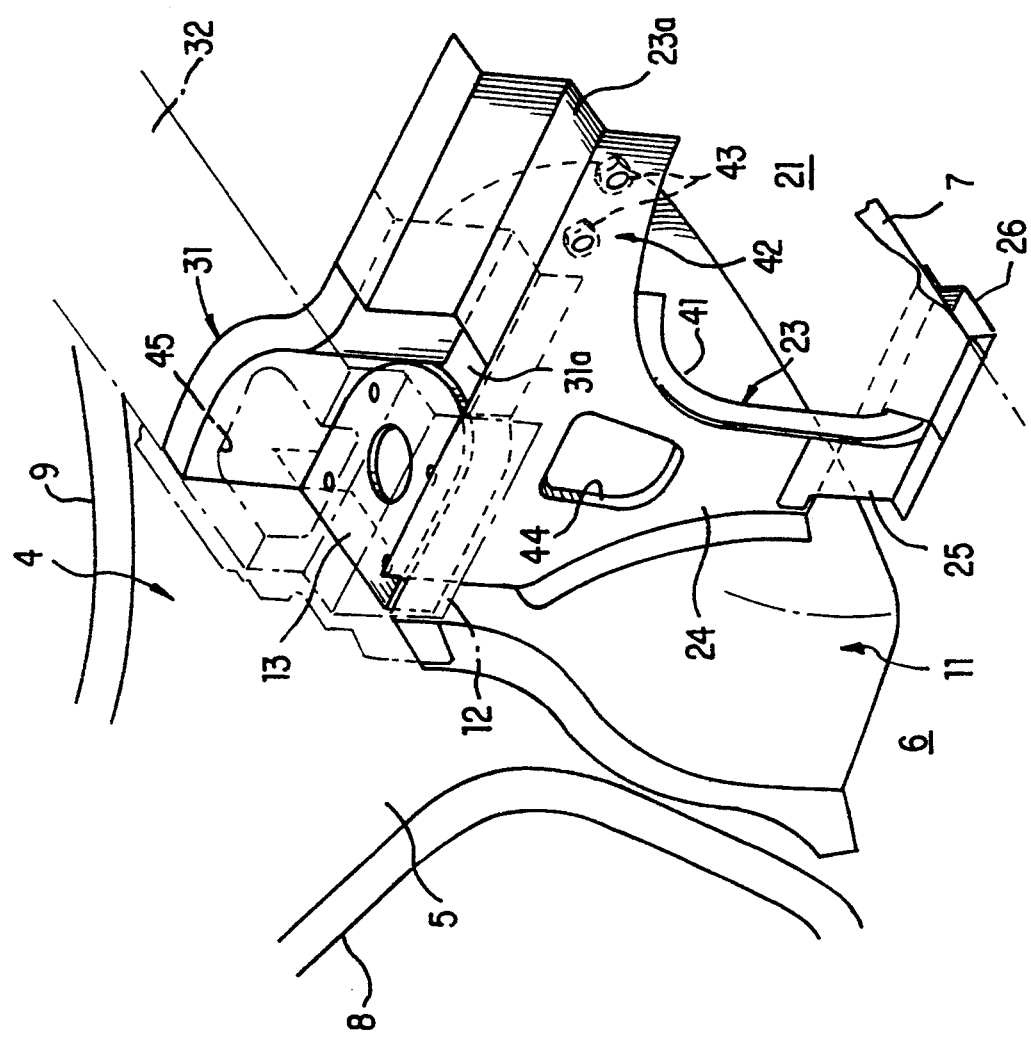
FIG. 2 is a perspective view of the rear body shown in FIG. 1, in which a package tray has been removed.
Figure 5:
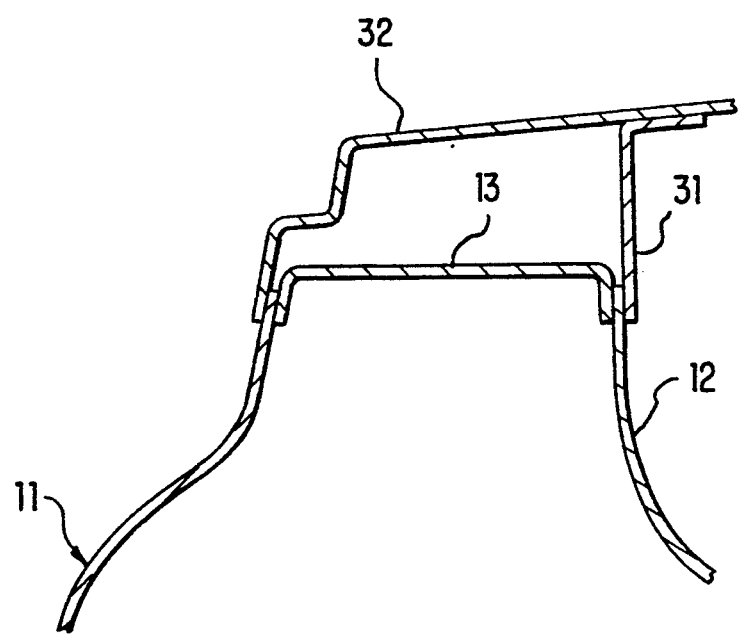
FIG. 5 is a cross sectional view of FIG. 1 along line II—II.
Figure 3:
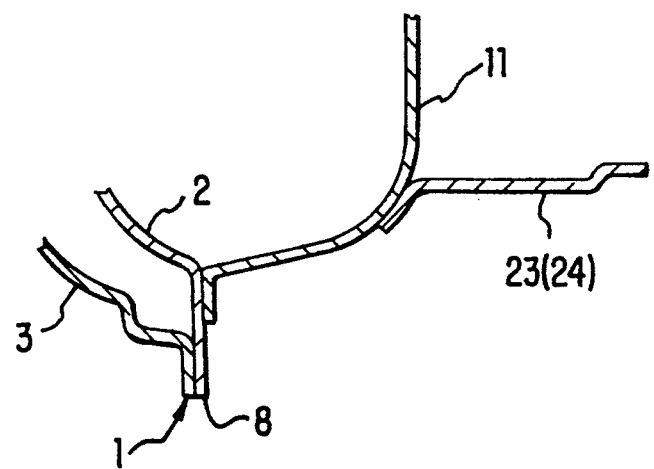
FIG. 3 is a cross sectional view of FIG. 1 along line VI—VI.

Referring to the drawings in detail, and, in particular, to FIGS. 1-3, a structure of the rear section of a vehicle body, as viewed from the inside of the car compartment, is shown, which has a rear fender 1 formed by an inner rear fender 2 and an outer rear fender 3 connected together. The rear fender 1 is formed at its upper forward end with a rear pillar 4 which is formed by an inner rear pillar 5 extending upward from the inner rear fender 2 and an outer rear pillar (not shown) extending upward from the outer rear fender 3. The rear fender 1 is connected at its lower end with the right side of a floor panel 7 forming a floor of a rear compartment 7. The rear pillar 4 defines part of a rear door opening 8 and a part of a rear window opening 9. The inner rear fender 2 is provided at its forward end with a rear wheel house 11 expanded inwardly into the car compartment 6. The rear wheel house 11 is secured to the inner rear fender 2 along an outer side thereof. The rear wheel house 11 is also secured to an outer side of the floor panel 7 along an lower side thereof. As shown in FIG. 5, the rear wheel house 11 is integrally formed with a rear suspension tower 12 extending upward from the middle thereof. The rear suspension tower 12 includes a top holding member 13 secured to an upper inner surface of the rear suspension tower 12 and the inner rear fender 2, by mean of which a rear suspension element (not shown), such as a shock absorber, is firmly held. The right and left rear suspension towers 12 hold and locate the right and left shock absorbers so that the distance between the right and left shock absorbers are widened toward their lower ends as viewed in a lengthwise direction of the vehicle body.

Figure 7:
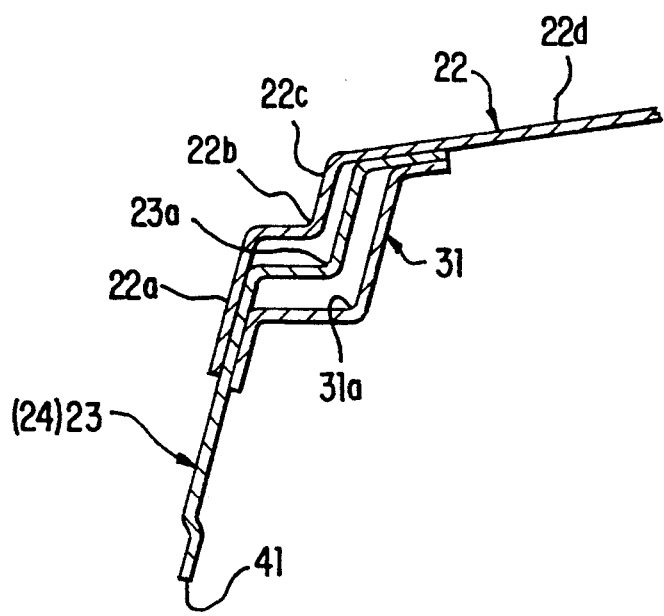
FIG. 7 is a cross sectional view of FIG. 1 along line IV—IV.
Figure 8:
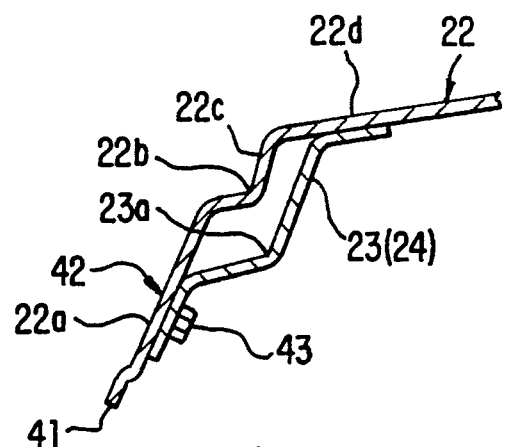
FIG. 8 is a cross sectional view of FIG. 1 along line V—V.

At the rear end of the car compartment 6 there is provided a package tray 22, by means of which the car compartment 6 is separated from a rear trunk compartment 21. The package tray 22 is formed by an upper tray panel 22c, extending in the lengthwise direction, and a stepped end wall 22' having a lower vertical wall portion 22a, a horizontal wall portion 22b and an upper vertical wall portion 22c, integrally formed with the upper tray panel 22d and extending downward from the forward end of the upper tray panel 22d. Between the rear suspension tower 12 and the package tray 22, there is provided an inner tray gusset 23. This inner tray gusset 23 is formed by an upper gusset member 24, secured to a forward lower wall portion of the rear wheel house 11 and extending inwardly into the car body, and a lower gusset member 25, secured between the upper gusset member 24 and the upper surface of the floor panel 7. Corresponding in lengthwise position to the lower gusset member 25, there is provided a channel-shaped floor cross member 26 transversely extending between the right and left rear wheel houses 11 and secured to the under surface of the floor panel 7. As shown in FIG. 8, the inner tray gusset 23, specifically the upper gusset member 24, has a stepped wall portion 23a extending upward, which is similar in shape to the stepped end wall 22' of the package tray 22 and is secured at its upper and lower portions to the package tray 22 from the back so as to provide a closed cross section extending transversely. Further, between the rear suspension tower 12 and the stepped wall portion 23a of the inner tray gusset 23, there is provided an outer tray gusset 31. This outer tray gusset 31 is secured to both rear wall portion of the rear suspension tower 12 and inner rear fender 2 along its outer end. As shown in FIG. 7, the outer tray gusset 31 is similar in shape to the inner tray gusset 23 and is secured at its upper and lower portions to the inner tray gusset 23 from the back so as to provide a closed cross section extending transversely. An access opening 41 is formed in the stepped end wall 22' of the package tray 22 and the inner tray gusset 23 for communicating the car compartment 6 and the trunk compartment 21 with each other when a rear seat back (not shown) is pushed forward down.

Figure 4:
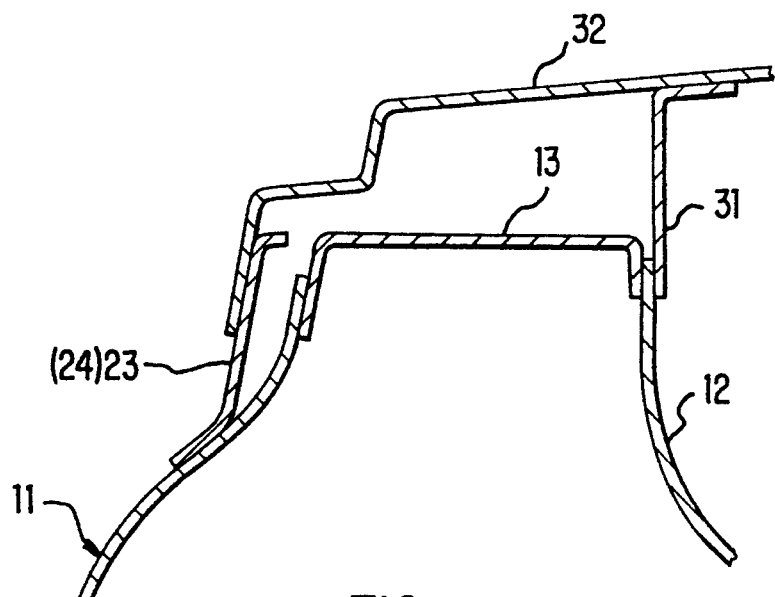
FIG. 4 is a cross sectional view of FIG. 1 along line I—I.
Figure 6:
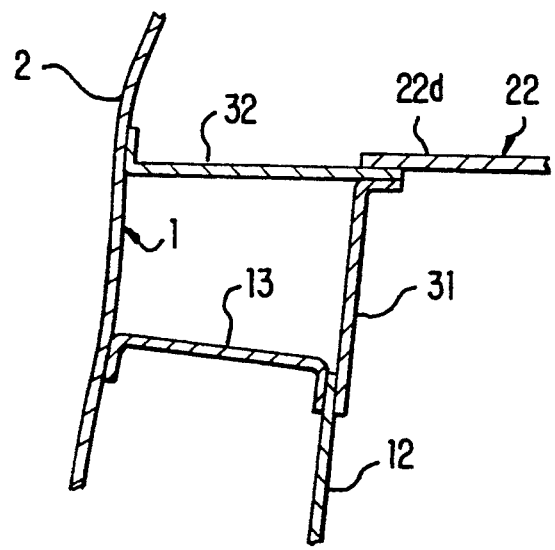
FIG. 6 is a cross sectional view of FIG. 1 along line III—III.

As shown in FIG. 6, between the inner rear fender 2 and the package tray 22, there is provided a junction member 32 secured at its outer side to the inner rear fender 2, at its forward and lower end to the front surface of the stepped wall portion 23a of the inner tray gusset 23 from the front, and at its inner side to the under lower surface of the package tray 22. As seen in FIG. 4, on the inner side of the rear suspension tower 12, a closed cross section is formed by the rear suspension tower 12, the top holding member 13 of the rear suspension tower 12, the inner tray gusset 23, the outer tray gusset 31 and the junction member 32 so as to extend transversely.

At a welded junction between the package tray 22 and the inner tray gusset 23 near the access opening 41, formed on the front of the stepped end wall 22' of the package tray 22 is a seat back rest portion 42 for catching the rear seat back. On the seat back rest portion 42, there is provided a retainer means (not shown), for releasably retaining the seat back in a raised position, which is mounted and fastened to the front of the stepped end wall 22' of the package tray 22 with bolts (not shown) screwed into nuts 43 welded to the back of the inner tray gusset 23. In the upper gusset member 24 there is formed with an access opening 44 for welding various elements, such as the inner tray gusset 23, the outer tray gusset 31 and the junction member 32. Moreover, there is formed an access opening 45 in the junction member 32 for maintenance, such as replacing of the shock absorber, etc.

The rear structure of the vehicle body according to the invention, in which a closed cross sectional hollow structure is provided by the gusset, and the first and second panels, namely a package gusset and a package junction, increases the structural rigidity independently for the right and left rear suspension towers by means of the gusset panel extending between the floor and the hollow structure and, in addition, disposes the right and left rear suspension at a fulcrum distance sufficient to prevent sideways fall and relative twist possibly caused by thrust-up force unevenly exerted to the right and left suspension towers from the right and left shock absorber.

Furthermore, the rear body structure of the present invention, in which a seat back rest portion is formed where the package gusset is secured to the gusset panel for catching a back of a bucket seat, increases the structural rigidity of the seat back rest portion with the gusset panel and disperses a load to the seat back rest portion from the seat back through the closed cross sectional hollow structure.

Although the present invention has been described with respect to a preferred embodiment thereof, various embodiment, it is to be understood that various other embodiments and variants may occur to those skilled in the art by following the teaching therein. Any such other embodiments and variants which fall within the scope and spirit of the present invention are intended to be covered by the following claims.

What is claimed is:

1. A rear body structure of a vehicle including rear suspension towers for supporting upper ends of rear suspensions, each of which is disposed on one side of a compartment of a vehicle and juts upward from a floor of the compartment and sideways into the compartment from a rear fender so as to form at least front and back wall portions for defining a housing for each said rear suspension, said rear body structure comprising:

- a gusset panel extending transversely in said compartment between said rear suspension towers, said gusset panel being secured to said floor and each said rear suspension tower;
- a first panel secured to said back wall portion and said gusset panel on a back side; and
- a second panel secured to said front wall portion and said gusset panel on a front side;
- said gusset panel and said first and second panels extending transversely into said compartment so as to provide a closed cross section between and above said rear suspension towers.

2. A rear body structure as defined in claim 1, wherein said first panel is further secured at one side to said rear fender.

3. A rear body structure as defined in claim 1, wherein said second panel is further secured at one side to said fender.

4. A rear body structure as defined in claim 1, wherein said first panel is stepped upward and backward.

5. A rear body structure as defined in claim 1, wherein said second panel is stepped upward and backward.

6. A rear body structure as defined in claim 1, wherein said gusset panel partly extends upward between said first and second panels so as to divide said closed cross section into two.

7. A rear body structure as defined in claim 1, wherein said gusset panel is formed with a seat back rest portion where the second panel is secured for catching a back of a bucket seat.

* * * * *